United States Patent Office 2,978,218
Patented Apr. 4, 1961

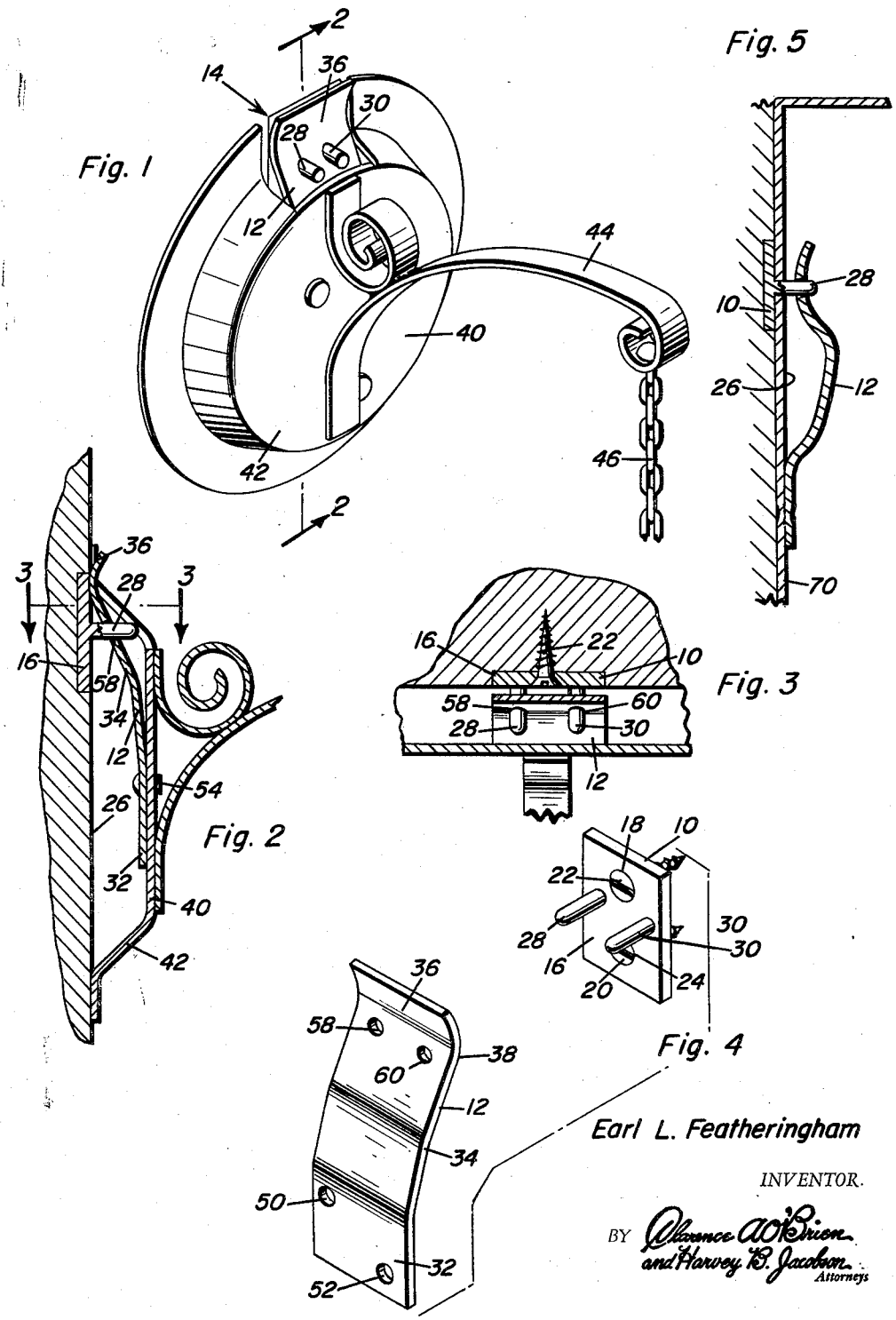

2,978,218

WALL BRACKET

Earl L. Featheringham, 1505 Byron Ave. SW.,
Massillon, Ohio

Filed June 9, 1959, Ser. No. 819,152

2 Claims. (Cl. 248—205)

This invention relates to supports and more particularly to a wall bracket.

An object of the invention is to provide a wall bracket capable of being applied to a wall, ceiling or any other supporting surface easily and with the distinct advantage of being able to remove the object supported by the wall bracket with little or no difficulty.

Another object of the invention is to provide an all-purpose wall bracket which includes a base capable of being attached to a supporting surface, together with a pair of locking pins engageable by a connection spring to hold any fixture or other object in a supported position on the surface, regardless of the orientation or angularity of the surface. In other words, the wall bracket may be installed on the ceiling, side wall or on any other supporting surface regardless of the orientation of the supporting surface.

One of the important features of the invention is found in the ease with which any article may be made to clip on and off of the wall bracket by simply releasing the connection spring from the pins. Yet, when the connection spring is engaged with the pins, the supported article is maintained firm and in fixed position.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of a typical embodiment of the invention.

Figure 2 is a sectional view taken on the line 2—2 of Figure 1.

Figure 3 is a sectional view taken on the line 3—3 of Figure 2.

Figure 4 is an exploded perspective view of a wall bracket and connection spring clip to be used therewith.

Figure 5 is a side view of an embodiment of the bracket assembly used with a comparatively heavy object.

In the accompanying drawing there is illustrated a wall bracket 10 and a connection spring gripper clip 12 which forms the major components of the wall bracket assembly 14. Wall bracket 10 is made of a mounting plate 16 having apertures 18 and 20 by which to receive fasteners, for instance screws 22 and 24 used in connecting the wall bracket to a supporting surface 26. A pair of parallel spaced pins 28 and 30 are attached to mounting plate 16 and rise from one surface thereof.

Connecting spring clip 12 is a leaf spring having a flat end portion 32 and a slanted portion 34 connected with the flat end portion. End portion 36 at the terminus of the slanted portion 34 is slightly curved in cross-section and has a rear surface 38 adapted to abut the front surface of mounting plate or base 16 (Figure 3).

A fixture 40 is shown in Figure 1. This fixture merely diagrammatically represents numerous types of articles which may be used with the mounting bracket assembly 14. The fixture has a fixture base 42 and a cantilevered arm 44 connected therewith so that a chain 46 can be suspended therefrom by which to hang a planter or some other object. It is to be explicitly noted that fixture 40 is purely diagrammatic and that any number of different kinds of articles can be supported by assembly 14.

Regardless of the type of article that is supported, the connection spring clip 12 must be secured thereto and accordingly, there are two apertures 50 and 52 provided in flat portion 32 of spring 34. Rivets 54, as shown, pass through apertures 50 and 52 for connecting the spring clip to the rear face of fixture base 42. Other types of fasteners may be used in place of the rivets.

In use and operation the wall bracket 10 is secured to the supporting surface 26 which may be at any angle and may be substantially any surface capable of supporting the weight of the fixture. Further the bracket 10 may be mortised in surface 26 (Figure 2), or applied directly onto the surface, this being a matter of choice.

Spring clip 12 is flexed by pulling on the curved end portion 36 to align the pair of apertures 58 and 60 with the locking pins 28 and 30. They will then slip easily thereon. However, due to the slanted part 34 of the spring clip, the spring clip will tend to return to its rest position at which the side walls or edges of the apertures 58 and 60 will bind on the pins 28 and 30 thereby very securely holding the spring clip 12 on the bracket 10 and also holding any fixture that is attached to the spring clip.

To remove the fixture, the end portion 36 is flexed outwardly from the mounting bracket 10 thereby again aligning the apertures 56 and 60 with the pins 28 and 30. In this condition the spring clip 12 and the fixture connected to it may be easily slid from the pins 28 and 30 of the mounting bracket.

Figure 5 shows a modification wherein the mounting bracket assembly is used wtih a heavier object, for example, a cupboard 70 or cabinet. In such a use, the wall bracket 10 is installed as described, and the back wall of the cupboard has two apertures through which pins 28 and 30 extend. The weight of the cupboard is carried by the pins 28 and 30, and spring clip 12 is secured to the wall of the cupboard in such position that apertures 58 and 60 thereof bind against pins 28 and 30. Spring clip 12 locks onto pins 28 and 30, and it forces the cupboard rear wall flush against supporting surface 26.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A bracket comprising a pair of pins for mounting on a support, a fixture comprising a base including an offset marginal portion for abutting engagement with the support over the pins, said base further having an opening therein exposing the pins, and a resilient gripper clip in the fixture having one end portion affixed thereto, the other end portion of said clip being free and slidably engageable under tension on the pins for frictionally gripping same and removably securing the fixture thereon, said free end portion of said clip being operable in the opening and having apertures therein receiving said pins.

2. A bracket comprising a plate for mounting on a wall, a plurality of parallel pins on said plate, a fixture comprising a generally cup-shaped base engageable with the wall over the plate and having a marginal opening therein exposing the pins, and a resilient, apertured gripper clip in the base operable in the opening and engageable with the pins for frictionally gripping same for mounting the fixture thereon.

References Cited in the file of this patent

UNITED STATES PATENTS

| | | |
|---|---|---|
| 860,816 | Marcum | July 23, 1907 |
| 1,149,141 | Hook | Aug. 3, 1915 |
| 1,569,278 | Hickman | Jan. 12, 1926 |
| 1,887,159 | Knight | Nov. 8, 1932 |
| 2,781,686 | Boyd | Feb. 19, 1957 |